Sept. 22, 1964 W. LAVALLEE 3,149,922
APPARATUS FOR TREATING GARBAGE TO PRODUCE COMPOST
Filed July 18, 1960 2 Sheets-Sheet 1

INVENTOR
Wilfrid LAVALLEE
BY Pierre Lespérance
PATENT AGENT

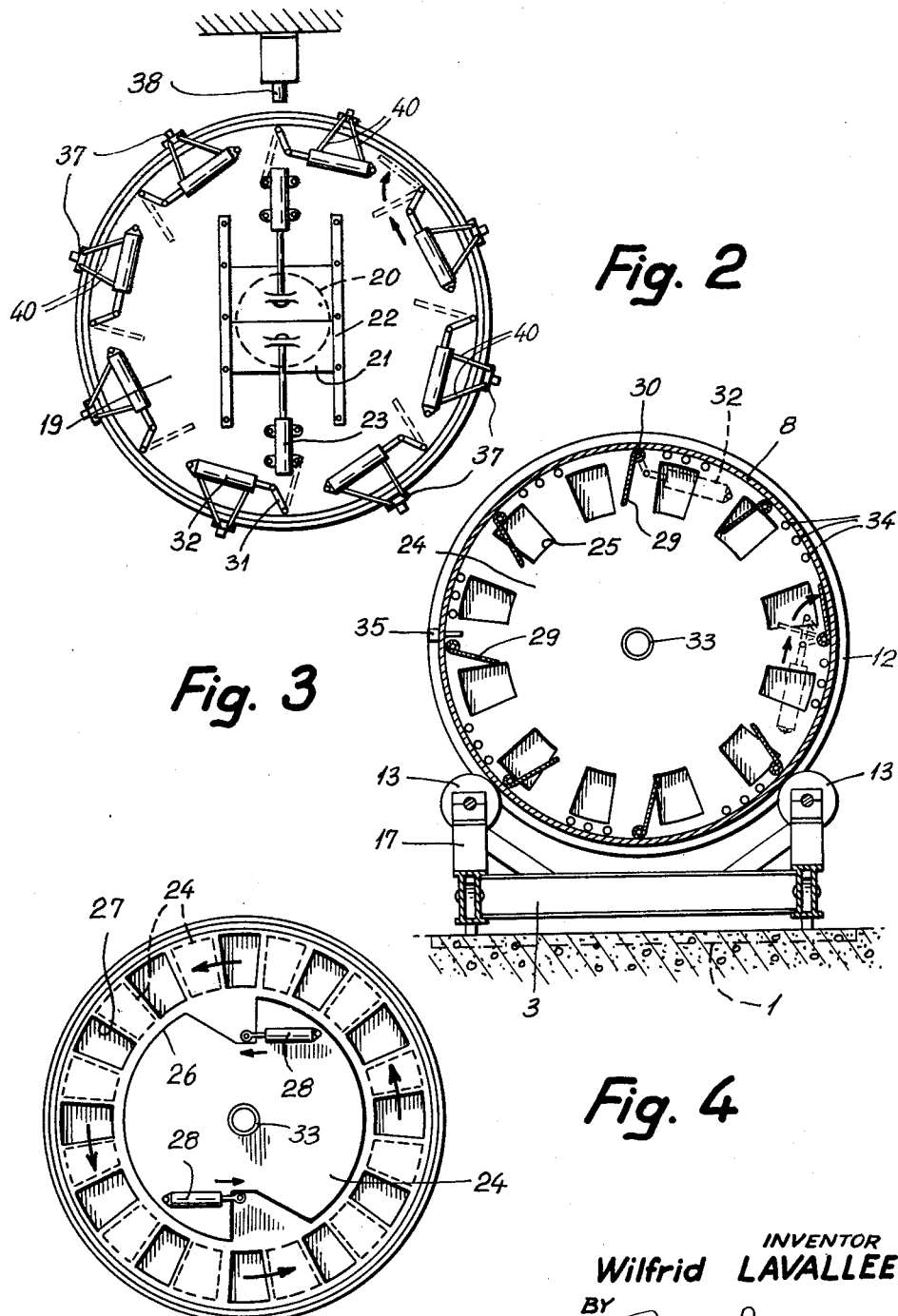

United States Patent Office 3,149,922
Patented Sept. 22, 1964

3,149,922
APPARATUS FOR TREATING GARBAGE TO PRODUCE COMPOST
Wilfrid Lavallée, Richelieu, Quebec, Canada, assignor to General Society of Refuse Recovery Limited, Montreal, Quebec, Canada
Filed July 18, 1960, Ser. No. 43,371
3 Claims. (Cl. 23—259.1)

The present invention relates to apparatus for treating garbage, and more particularly to a digester for subjecting comminuted garbage material to a heating and biochemical oxidation treatment, said garbage material having been previously subjected to treatment in a segregator as described in co-pending patent applications entitled "Method and Apparatus for Treating Garbage," filed July 18, 1960, Serial No. 43,425, now abandoned, and "Segregator," filed July 18, 1960, Serial No. 43,372, now Patent No. 3,061,205, by the same applicant.

The main object of the present invention resides therefore in the provision of a digester for treating a garbage portion high in organic content, so as to produce compost.

Yet another object of the present invention resides in the provision of a digester of the character described which can also be used for treating other types of foodstuff waste, such as butcher and slaughter house by-products and waste, to make poultry feed or other animal feed.

A more specific object of the present invention resides in the provision of a digester of the character described so constructed and arranged that the comminuted material is subjected to an agitating action and to exposure to air under a cyclically varying pressure to thereby subject the material to accelerated biochemical oxidation process which results in stimulated microbial formation and liberation of the nutrients in the compost raw materials.

Another important object of the invention resides in the provision of a digester of the character described provided with means for drying the material after the digesting process while the material is still in the digester.

A further object of the present invention resides in the provision of a digester in the form of a rotary drum provided with means for inclining the drum to facilitate loading and unloading of the same while enabling continuous rotation of the drum.

Still another object of the invention resides in the provision of a digester in the form of a rotary drum provided with lifting blades which are collapsible even when the digester has a load of material.

Another important object of the invention resides in the provision of a digester of the character described which is of relatively simple and sturdy construction.

Yet another important object of the present invention resides in the provision of a digester in the form of a rotary drum which can be hermetically sealed and having no inside partitions and complicated transfer means from one compartment into another.

The foregoing and other important objects of the invention will be more apparent during the following disclosure and by referring to the drawings, in which:

FIGURE 2 is an end view taken along line 2—2 of FIGURE 1;

FIGURE 3 is a cross-section taken along line 3—3 of FIGURE 1; and

FIGURE 4 is an end view of the discharge end of the digester and taken along line 4—4 of FIGURE 1.

Figure 1:
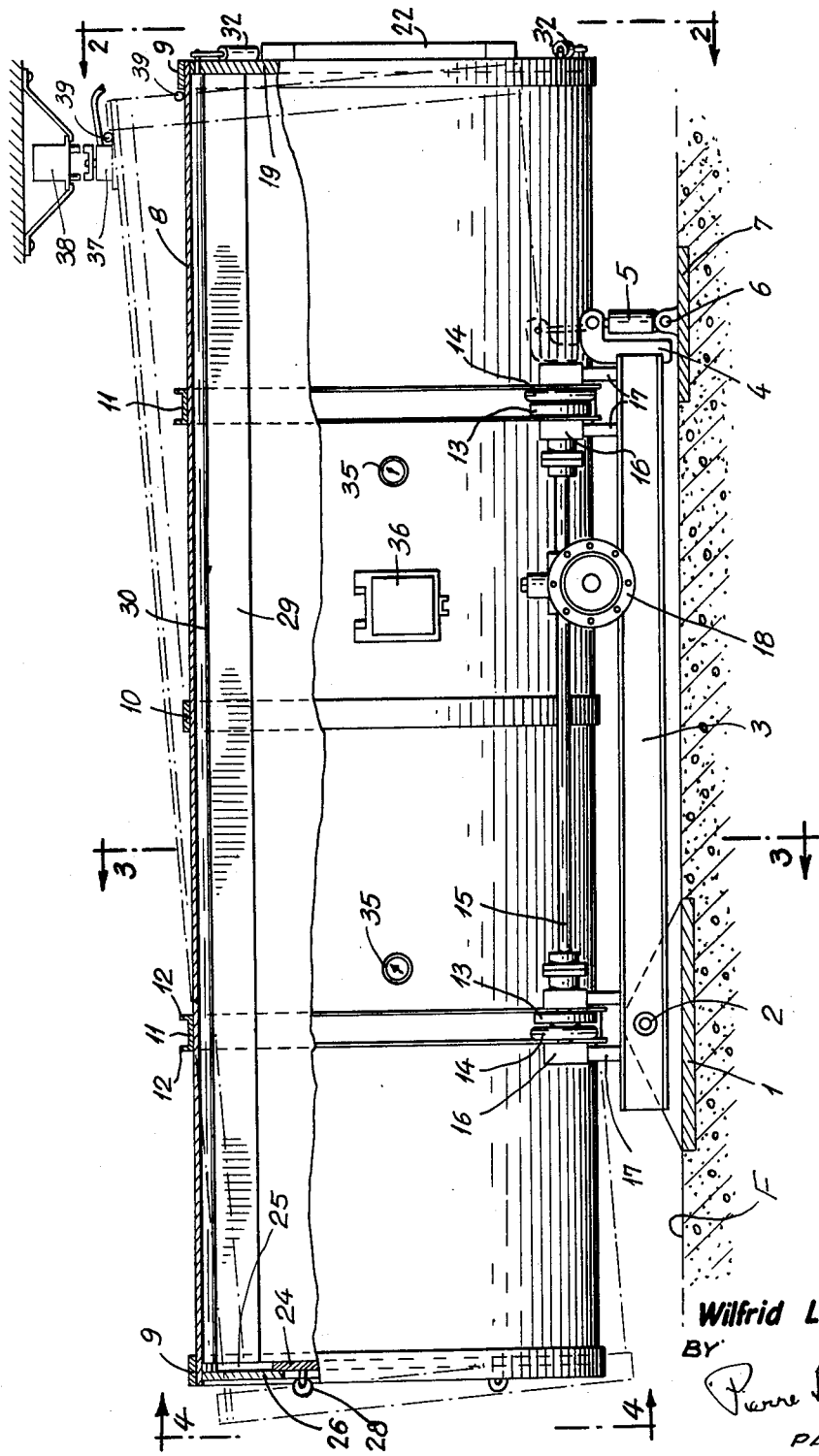
FIGURE 1 is a side elevation, partially in longitudinal section, of the digester.

Referring now more particularly to the drawings in which like reference characters indicate like elements throughout, reference numeral 1 indicates a pedestal anchored in floor F and providing a pivot pin 2 for the pivotal connection to pedestal 1 of one end of a supporting frame 3 made of I-beam members and the other end of which is pivotally connected by means of strap 4 to the piston rod of hydraulic cylinder and piston units 5, the lower end of which is pivoted at 6 to ears protruding from a base plate 7 anchored in floor F. There is a cylinder and piston unit 5 on each side of the digester and actuation of said units will cause lifting movement of the frame 3 and digester supported thereon so that the latter will take an inclined position, as shown in dot and dash lines in FIGURE 1. The digester proper consists of a drum 8 made of sheet metal or of thick lumber in accordance with the specific applications, wood being a good heat insulator resulting in economy of the heating medium and reducing the heat loss to surrounding atmosphere. The drum 8 is reinforced by end straps 9 and central strap 10 surrounding the drum 8, and by ring members 11 of channel shaped cross section providing an outer cylindrical running surface with outwardly projecting guiding flanges 12. On one side of the drum 8 the latter is supported and driven in rotation by means of two groups of supporting wheel 13 and driving wheel 14, each group being in contact with one ring member 11. The supporting wheel 13 is a metal wheel in metal to metal contact with the guiding ring 11 to take the major portion of the load while the driving wheel 14 is a rubber tire wheel in frictional contact with the ring member 11. Both groups of wheels are secured or keyed to a driving shaft 15 which is journaled in bearings 16 supported by brackets 17 rigidly secured to frame 3. The shaft 15 extends longitudinally of the drum 8 and is driven by an electric motor and speed reducing unit 18. At the back side of the digester, the drum 8 is supported by two pairs of supporting idle wheels 13 there being no driving wheels. Thus, the drum 8 can be continuously rotated either when it is horizontal position or in inclined position. If desired, the wheels on both sides of the drum can be driven by connecting chain from unit 18.

As shown in FIGURE 2, the inlet end of the drum 8 has a closure wall 19 provided with a circular central inlet opening 20 that can be hermetically closed by two sliding doors 21 guided in rails 22 secured to closure 19 and actuated by air cylinder and piston units 23, the piston rod of which is secured to the door and the cylinder of which is secured to closure 19.

The outlet or downstream end of the drum 8 is closed by wall 24 provided with an annular series of equally spaced generally trapezoidal openings 25 extending along the marginal portion of wall 24. An annular closure plate 26, provided with a plurality of equally spaced apertures 27 fits over wall 24 and is rotatable under action of oppositely directed air cylinder and piston units 28 to take a drum closing position, as shown in FIGURE 4, wherein the apertures 27 register with the closure plate 24 between openings 25 and a drum opening position wherein apertures 25 and 27 are in register.

Lifting blades or baffles 29 longitudinally extend throughout the full length of drum 8 adjacent the cylindrical wall of said drum and are arranged for pivotal movement between an active radially inwardly extending position shown in FIGURE 3 and an inactive position flat against the cylindrical wall of the drum, as shown for one of the blades in FIGURES 2 and 3. Each blade 29 is welded to a strong tube 30 journalled at both ends to the end closures 19 and 24 and passing through closure 19; each tube 30 has at its projecting end a rigid crank arm 31 pivotally connected to the piston rod of a piston and cylinder unit 32 mounted on the outside of closure 19, and actuated by air pressure. The cylinder and piston units 32 which constitute the actuator means for the blades 29, are double acting and there is one unit for each lifting blade 29, such that the blades 29 may be folded or unfolded independently from one another. Control means are arranged to operate in succession the actuator means associated with each blade 29 to pivot each blade when it reaches the topmost portion of the rotating drum. More specifically, each cylinder unit 32 has its own rotary three way air valve 37 disposed at the periphery of drum 8 with an actuating arm having two buttons projecting radially outwardly and adapted to come in successive contact with either arm of a solenoid actuated double abutment arms 38 during rotation of drum 8 in the inclined position of the latter. When these abutment arms, which are suspended from the ceiling, are in retracted position, being remotely controlled by an operator, the cylinders 32 are not actuated and the blades 29 remain in their position. On the other hand, when any one of the two abutment arms 38 is depressed, it successively comes in contact with the registering buttons of the valves 37 of the cylinder units 32 whereby as each blade 29 reaches the topmost portion of its circular travel, its cylinder unit 32 is actuated to either pivot the blade 29 into inoperative or operative position, depending on the button actuated.

Compressed air supply pipe 39 surrounds the drum 8 and supplies compressed air to all the valves 37 which in turn are connected by flexible tubing 40 to both ends of the respective cylinder units 32. One side of units 32 is subjected to air pressure while the other side is exhausted to atmosphere through valve 37. With this arrangement, it is thus possible to fold or unfold the blades 29 even when the digester is filled with material because the blades are only operated when in the topmost portion of the drum and free of any material which has already dropped into the lowermost portion of the drum.

In accordance with the invention, an air duct 33 of the necessary diameter enters into the drum through the center of downstream closure 24, a suitable joint being provided at the entrance of said air duct within the cylinder. The air ducts 33 from the several digesters are connected to a common reversible air blower, whereby air may be fed under pressure within the respective digesters when the closure doors are closed or air may be sucked from the digesters by the same air blower upon reversing of its rotation to thereby create a vacuum within the digesters. Air under high pressure for actuating the air cylinders 32 and 23 is supplied by an air pipe (not shown) passing through air duct 33 and provided with a suitable rotating joint. Steam pipes 34 are arranged in a continuous coil extending longitudinally of the drum at the inside face thereof and equally spaced around the periphery of the drum. The outlet and inlet for the steam pipes 34 extend through air duct 33 and are preferably concentric with the air pressure supply, pipe, rotary joints being provided for steam pipes 34 at the entrance of the drum.

The drum is also provided with thermometers 35 and a hygrometer 36. In the use of the invention, the digester drum being empty, the drum is first inclined downwardly towards its discharge end, as shown in dot and dash lines in FIGURE 1, the sliding doors 21 are opened, and the discharge openings being closed, the blades 29 are folded into inoperative position flat against the wall of the drum 8. The garbage material to be treated is discharged into the drum 8 through inlet opening 20 by travelling hoppers, as described and claimed in co-pending application entitled "Method and Apparatus for Treating Garbage." The drum 8 is continuously rotating at a constant speed in the range of about ⅞ of one revolution per minute during filling thereof, such that due to the inclination of the drum the garbage material will form a layer of substantially uniform depth throughout the length of the drum. Filling of the drum is stopped when the latter is filled to approximately 40% of its volume. The doors 21 are then closed and the drum is returned to its horizontal position and rotation is continued for the digesting process. During this time, air is fed through air duct 33 within the closed digester to build up the air pressure above atmospheric pressure for about ½ an hour, then the air pump is reversed to create a vacuum below atmospheric pressure for about the next half hour. This cyclic air pressure variation is continued for the entire digesting process such that the digester breathes and oxygen is admitted for the bio-chemical oxidation processes taking place in the raw garbage to thereby promote formation of bacteria and liberation of the nutrients. During the digesting process, steam is also admitted if necessary through steam pipes 34 to gently heat the material and space within the drum so as to maintain the proper temperaturer for biochemical oxidation process. During the digesting process the blades 29 are in inoperative position in order to permit rubbing of the material particles against one another which is essential for the biochemical oxidation process. The glass, pottery, and other hard particles in the material serve as grinding means to wear down solid organic materials such as bones and the like.

At the end of the digesting process, the material in the digester is dried in the following manner: The lifting drum 8 is inclined by extending units 5 and blades 29, which were inoperative during the digesting process, are caused to take their radially directed operative position in succession as they reach the topmost portion of the drum under the action of the means previously described. The drum 8 is lowered into horizontal position and steam supplied to the pipes 34 is increased, rotation of the drum is continued and the air blower is reversed for creating a small continuous vacuum in the digester for the complete period of drying. During this time, the material is lifted by the blades 29 and falls back into the cylinder to accelerate the drying. The resulting material which now consists of dry particles is now ready for discharge from the digester. For the unloading operation, the digester is again inclined downwardly towards its discharge end and the annular closure plate 26 is actuated by its cylinders 28 for opening the discharge end whereby the material is unloaded onto a suitable conveyor through the openings 25 and 27 as the latter successively reach the lowermost portion of the drum 8. The material discharged from the digester is ready for the final screening operation in the production of compost.

While a preferred embodiment in accordance with the present invention has been illustrated and described it is understood that various modifications may be resorted to without departing from the spirit and scope of the appended claims.

What I claim is:

1. A digester comprising a base frame pivotally mounted on the ground at one end, jacking means attached to the other end of said base frame for pivoting said base frame so that it may take an inclined position, driving and supporting wheels supported by said base frame, a cylindrical drum supported by said wheels and rotated by said driving wheels about its longitudinal axis, motor means to drive said driving wheels, said drum having inlet and outlet openings at opposite ends thereof, closure means to close said openings, lifting blades extending longitudinally of said drum within the same in close proximity with the inside face of the cylindrical wall thereof, means pivotally mounting said blades within said drum for pivotal movement of said blades between an active position radially inwardly projecting within the drum, and an inactive position folded flat against said cylindrical wall of the drum, actuator means associated with each blade for pivoting said blades between said two positions independently of one another, and control means operating said actuator means when the associated blade reaches the topmost portion of said drum during rotation of the latter, said outlet openings consisting of a series of equally spaced and annularly arranged openings made in the outer marginal portion of the end wall of said drum, and said closure means for said outlet openings consisting of an annular plate member slidably fitted over said end wall for rotation with respect to the same about its center, said annular closure plate having a plurality of equally spaced openings adapted to register with the outlet openings of said end wall in one position of said plate and adapted to register with the imperforate portion of said end wall in the closed position of said closure plate, and power means for moving said closure plate between said two positions.

2. A digester as claimed in claim 1, further including an air supply duct opening within said drum through the center of the end wall provided with said outlet openings for supplying and exhausting air into and from said digester.

3. A digester comprising a base frame pivotally mounted on the ground at one end, jacking means attached to the other end of said base frame for pivoting said base frame so that it may take an inclined position, driving and supporting wheels supported by said base frame, a cylindrical drum supported by said wheels and rotated by said driving wheels, said drum having inlet and outlet openings at opposite ends thereof, closure means to close said openings, lifting blades extending longitudinally of said drum within the same in close proximity with the inside face of the cylindrical wall thereof, means pivotally mounting said blades within said drum for pivotal movement of said blades between an active position radially inwardly projecting within the drum, and an inactive position folded flat against said cylindrical wall of the drum, actuator means associated with each blade for pivoting said blades between said two poistions independently of one another, and control means operating said actuator means when the associated blade reaches the topmost portion of said drum during rotation of the latter, said supporting wheels being metal wheels in metal-to-metal contact with annular running surfaces of said drum, and said driving wheels being pneumatic tire wheels in frictional contact with said running surfaces, and said motor means including a motor and speed reducing unit connected to said driving wheels and mounted on said base frame, whereby said drum can be continuously rotated irrespective of the inclined position of said drum.

References Cited in the file of this patent
UNITED STATES PATENTS

| | | |
|---|---|---|
| 638,363 | Sharples | Dec. 5, 1899 |
| 899,961 | Edgerton | Sept. 29, 1908 |
| 952,224 | Yarnall | Mar. 15, 1910 |
| 1,528,851 | Rodling et al. | Mar. 10, 1925 |
| 2,049,889 | Boniface | Aug. 4, 1936 |
| 2,474,899 | Eweson | July 5, 1949 |
| 2,710,423 | Douglas | June 14, 1955 |
| 2,776,877 | Cardon | Jan. 8, 1957 |
| 2,885,279 | Mortenson | May 5, 1959 |
| 2,954,285 | Carlsson | Sept. 27, 1960 |